United States Patent
Mikhailov et al.

(10) Patent No.: US 10,395,012 B2
(45) Date of Patent: *Aug. 27, 2019

(54) MEDIA CLIENT DEVICE AUTHENTICATION USING HARDWARE ROOT OF TRUST

(71) Applicant: ERICSSON AB, Stockholm (SE)

(72) Inventors: Mikhail Mikhailov, Newton, MA (US); Raj Nair, Lexington, MA (US)

(73) Assignee: ERICSSON AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/925,482

(22) Filed: Mar. 19, 2018

(65) Prior Publication Data

US 2018/0211016 A1 Jul. 26, 2018

Related U.S. Application Data

(63) Continuation of application No. 14/907,152, filed as application No. PCT/US2014/047830 on Jul. 23, 2014, now Pat. No. 9,922,178.

(60) Provisional application No. 61/857,656, filed on Jul. 23, 2013.

(51) Int. Cl.

| G06F 21/00 | (2013.01) |
|---|---|
| G06F 21/12 | (2013.01) |
| G06F 21/10 | (2013.01) |
| G06F 21/57 | (2013.01) |
| H04L 9/32 | (2006.01) |
| G06F 21/44 | (2013.01) |

(52) U.S. Cl.
CPC .............. *G06F 21/12* (2013.01); *G06F 21/10* (2013.01); *G06F 21/445* (2013.01); *G06F 21/575* (2013.01); *H04L 9/3247* (2013.01); *G06F 2221/034* (2013.01); *G06F 2221/0735* (2013.01)

(58) Field of Classification Search
CPC ....................................................... G06F 21/00
See application file for complete search history.

(56) References Cited

U.S. PATENT DOCUMENTS

| 2005/0144439 A1 | 6/2005 | Park et al. |
|---|---|---|
| 2008/0082828 A1 | 4/2008 | Jennings et al. |
| 2009/0276617 A1 | 11/2009 | Grell et al. |
| 2012/0096560 A1 | 4/2012 | Selander et al. |
| 2012/0303951 A1 | 11/2012 | Medvinsky et al. |
| 2013/0152180 A1 | 6/2013 | Nair et al. |

FOREIGN PATENT DOCUMENTS

| EP | 2495932 A1 | 9/2012 |
|---|---|---|
| WO | 2012106097 A2 | 8/2012 |
| WO | 2008100264 A | 3/2013 |

*Primary Examiner* — Josnel Jeudy

(57) ABSTRACT

A client device for media playback includes a user-installable media client application which implements the client-side of a digital rights management (DRM) system. The client device employs secure boot and verifies the user-installed application. The application is hardened against reverse engineering, and it utilizes a special API provided by the client device to tie into the secure boot, bridging the gap between the secure boot and the client-side of the DRM system contained within the application.

10 Claims, 7 Drawing Sheets

MEDIA CLIENT DEVICE AUTHENTICATION USING HARDWARE ROOT OF TRUST

This application is a continuation of U.S. patent application Ser. No. 14/907,152, filed Jan. 22, 2016, and granted as U.S. Pat. No. 9,922,178 on Mar. 20, 2018, which is a national phase entry of PCT/US2014/047830, filed Jul. 23, 2014, which claims the benefit of U.S. Provisional Application No. 61/857,656, filed Jul. 23, 2013, the disclosures of which are fully incorporated herein by references.

SUMMARY

A technique is disclosed for establishing trust between a client device and a server via an application installed on the client device. The client device is adapted for rendering or playback of media. It could be a Set-Top-Box (STB) having IP connectivity. It could also be a mobile device, such as a smart phone, or any other type of client device. The operating system running on the client device could be Android, Linux, Windows 8, or any other operating system.

The client device has one or more secret values burnt into hardware such that they are always present and cannot be removed or altered. A secure boot process relies on these secret values to ensure that certain components of persistent, non-volatile storage, such as additional secrets, a boot loader, the operating system itself and its various components, can be verified at boot time and can be shown to be genuine, as they were installed at the factory or during an authorized upgrade process, and not tempered with.

Once the integrity of the device and the operating system is verified, the application (launched either automatically or by a user), establishes trust between the client device and a server using a special application programming interface (API) provided by the system which utilizes the secret values available on the device and verified during the secure boot process.

The application, which implements the client-side of a digital rights management (DRM) system, is user-installable/renewable on the client device. The client device employs secure boot and verifies the user-installed application. The application may be hardened against reverse engineering, and it uses a special API provided by the client device to tie into the secure boot, bridging the gap between the secure boot and the client-side of the DRM system contained within the application.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Figure 1:
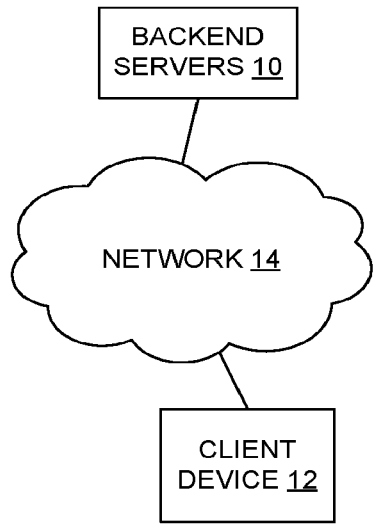
FIG. 1 is a block diagram of a networked system for content delivery and playback.

FIG. 1 is a simplified view showing pertinent components of a networked system for storing, delivering and playing protected content such as encrypted video files. In this simplified view, the system includes a set of backend servers or "backend" 10 connected to a client device 12 via a network 14. The backend 10 is described in more detail below. The client device 12 is generally a computerized device having playback capability including the decryption of encrypted content files. Examples of client devices include a personal computer, tablet computer, smart phone, etc. Decryption keys used in to decrypt the encrypted content files are provided to the client device 12 by the backend 10. In operation as described more below, the client device 12 authenticates itself to the backend 10 and provides information establishing its authorization to play identified encrypted content (e.g., a particular video). The backend 10 responds by providing one or more decryption keys enabling the client device 12 to decrypt the content file(s) for the video. The client device 12 obtains the encrypted content files from a content server (not shown) of the backend 10, decrypts the files using the decryption keys, and then renders (plays) the decrypted content.

The backend 10 may be implemented using one or more server computers, which may be co-located (e.g., in a datacenter) or distributed in some manner over multiple locations. Some or all servers may be part of a content delivery network (CDN). In operation, content from a content publisher may be ingested and then segmented for segment-based delivery to the client devices 12. A media preparation engine obtains content encryption/decryption keys from a digital rights management (DRM) server of the backend 10 and uses the keys to encrypt content for storage and later delivery in encrypted form. The backend 10 may employ a rights server as focal point for DRM-related operations and communications, in which case the DRM server may be more specifically tailored for encryption key generating, storage and retrieval using appropriate network protocols.

Figure 2:
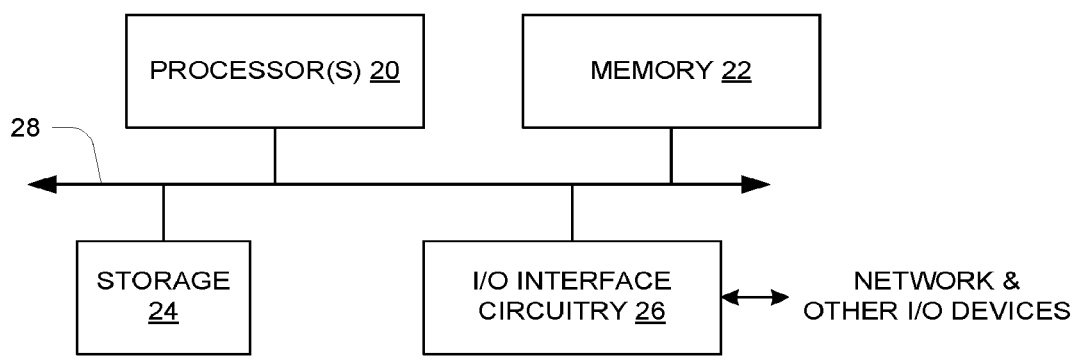
FIG. 2 is a block diagram of a hardware organization of a computerized device.

FIG. 2 is a generalized depiction of a computerized device such as may be used to realize the client device 12 and a server of the backend 10. It includes one or more processors 20, memory 22, local storage 24 and input/output (I/O) interface circuitry 26 coupled together by one or more data buses 28. The I/O interface circuitry 26 couples the device to one or more external networks (such as network 14), additional storage devices or systems, and other input/output devices as generally known in the art. System-level functionality of the device as described herein is provided by the hardware executing computer program instructions (software), typically stored in the memory 22 and retrieved and executed by the processor(s) 20. Any description herein of a software component performing a function is to be understood as a shorthand reference to operation of a computer or computerized device when executing the instructions of the software component. Also, the collection of components in FIG. 2 may be referred to as "processing circuitry", and when executing a given software component may be viewed as a function-specialized circuit, for example as a "player circuit" when executing a software component implementing a content player function. As described below, the client device 12 includes a more specialized hardware organization for purposes of security.

In one embodiment the client device 12 has a specialized organization lending itself to sensitive applications including the DRM aspects of media delivery and playback. In particular, the client device 12 may partition circuitry and functionality between a secure execution environment and a normal or non-secure environment. Hardware components may include an application processor in the non-secure environment and a separate secure processor in the secure environment. Operating software in the non-secure environment may include an operating system (O/S) and a content player application (referred to as an "app"). In one embodiment, the operating system is the Android® operating system for mobile devices. The components in the secure environment are responsible for establishing a root of trust with the backend 10 (FIG. 1) to enable the client device 12 to obtain decryption keys for decrypting content. The secure environment includes a secure kernel and secure memory. The client device also includes a media client that sends requests to the backend 10 to register the device 12, obtain rights objects for playback of media objects, and performs other functions that enable decryption and playing of media objects. The media client may have separate secure and non-secure portions partitioned between the secure and non-secure environments accordingly.

In one embodiment, the secure environment of the client device 12 may employ components of the so-called TrustZone family, including the secure processor realized according to the ARM architecture, as well as the secure kernel and secure memory which are specially tailored for security-related uses. Establishing a root of trust may be based partly on security features offered by the secure processing hardware that is embedded in a circuit board used to build a device 12 (e.g., mobile phone handset). A chipset manufacturer provides the hardware, and a device manufacturer (OEM) loads certain firmware (code) such as described more below.

Figure 3:
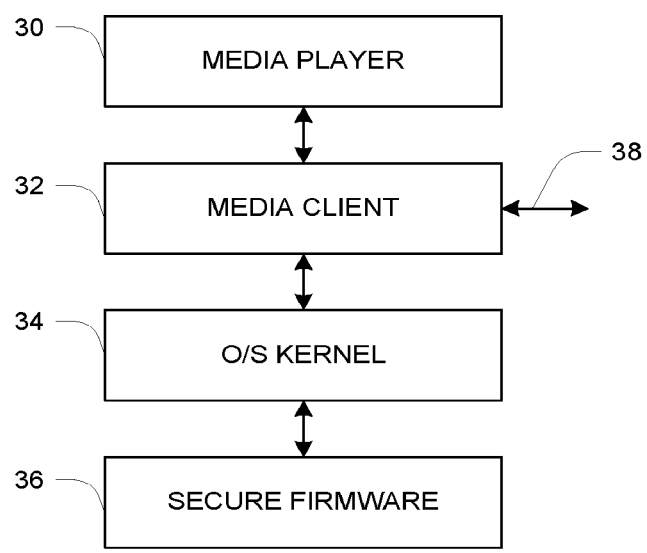
FIG. 3 is a schematic diagram of a software/firmware organization of a client device.

FIG. 3 shows an organization of the client device 12 from a software perspective, which also reflects the above-described partitioning between secure and non-secure environments. It includes a media player 30, media client 32, operating system (OS) kernel 34 and secure firmware 36. The media client 32 has a functional connection 38 to the backend 10. In operation, the media player 30 renders media such as video on a suitable facility of the client device 12, such as a display. The media player 30 also includes a graphical user interface enabling a user to control the selection and playback of media, as generally known in the art. The media client 32 performs various functions related to the downloading of media for playback (rendering), including overall control of device registration, delivery of encryption keys, and downloading of media (content) from the network 14. The device registration functionality is described more specifically below, along with pertinent functionality of the OS kernel 34 and secure firmware 36.

Figure 4:
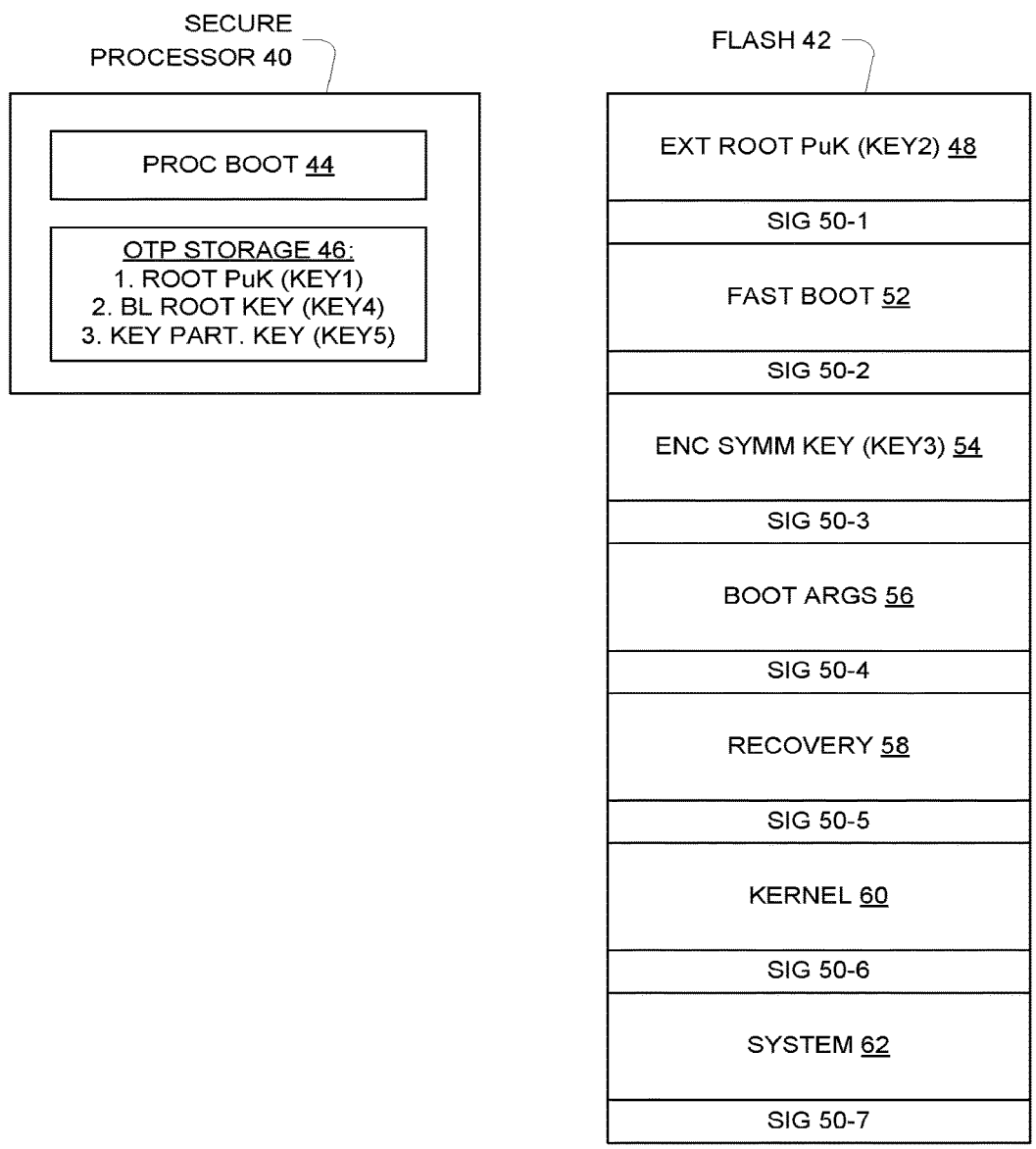
FIG. 4 is a schematic diagram of contents of a secure processor and flash-programmable (flash) memory in a client device.

FIG. 4 shows certain structure and data items in the client device 12, including a secure processor 40 and a nonvolatile flash-programmable (flash) memory 42. In the operation described below, the secure processor 40 executes code and accesses data items stored in the flash 42. However, the secure processor 40 also has relevant lower-level (hardware) components and operations. Specifically, the processor 40 includes a read-only memory (ROM) that stores a small processor boot (PROC BOOT) routine 44 that is automatically executed upon a reset or power cycling. It also includes one-time programmable (OTP) storage 46 for permanent hardware-level storage of certain fundamental data items including a root public key (PuK) KEY1, a BL root key KEY4, and a key partition (part.) key KEY5. The OTP storage may be realized using an array of fuses that are selectively opened ("blown") at a time of manufacture of the client device 12, for example.

The flash 42 stores the following items along with respective signatures (SIG) 50:
1. External root public key 48 (KEY2) and signature 50-1
2. Fast boot code 52 and signature 50-2
3. Encryption symmetric key 54 (KEY3) and signature 50-3
4. Boot arguments 56 and signature 50-4
5. Recovery code 58 and signature 50-5
6. Kernel code 60 and signature 50-6
7. System code 62 and signature 50-7

Figure 5:
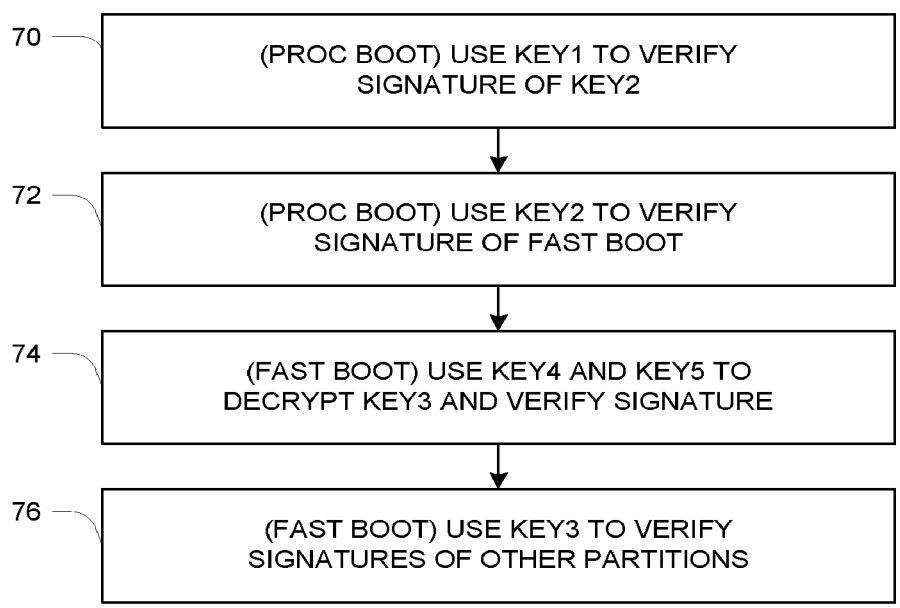
FIG. 5 is a high-level flow diagram of a secure boot process.

FIG. 5 outlines the secure boot process.

At 70, the processor boot code 44 verifies the signature 50-1 of KEY2 using the following specific operations:
1. Compute a secure hash H2 (e.g., SHA-256 hash) of checksum of External Root Public Key (KEY2)
2. Read Root Public Key (KEY1) in OTP 46 and use KEY1 to decrypt the signature 50-1 of KEY2 and compare to H2

At 72, the processor boot code 44 verifies the signature 50-2 of the Fast Boot image 52 using KEY2. This is done by decrypting the signature 50-2 with KEY2 and comparing the result with a calculated secure has hash of the Fast Boot image 52.

At this stage, the Fast Boot image 52 is loaded into memory and begins execution. Because subsequent steps require accessing the OTP 46 which can only be done by the secure processor, Fast Boot is executed by the secure processor.

At 74, the encrypted KEY3 54 is decrypted and its signature verified. The following steps are used:
a. First, the encrypted KEY3 is decrypted using the BL Root key KEY4 stored in the OTP 46
b. Next, an AES CBC-MAC signature of the decrypted KEY3 is calculated using an intermediate key derived from KEY4 and KEY5
c. The stored signature 50-3 of KEY3 is decrypted using the Key Partition key KEY5
d. The respective outputs of steps b and c are compared to verify the integrity of KEY3

At 76, Fast Boot checks the remaining partitions of the flash 42 using KEY3:
1. Checking signature 50-4 of the boot arguments 56
2. Checking the signature 50-5 of the recovery code 58
3. Checking the signature 50-6 of the kernel 60
4. Checking the signature 50-7 of the system code 62

After the above secure boot process, control is passed to the kernel 60.

In one embodiment, the keys KEY1 and KEY2 are 2048 bits long. They may be provided by a specific provider of DRM infrastructure, such as the assignee of this patent. An otherwise conventional client device 12 such as a smartphone may need to be modified to only allow execution of apps signed using certificates from specified certificate authorities including from the assignee.

Figure 6:
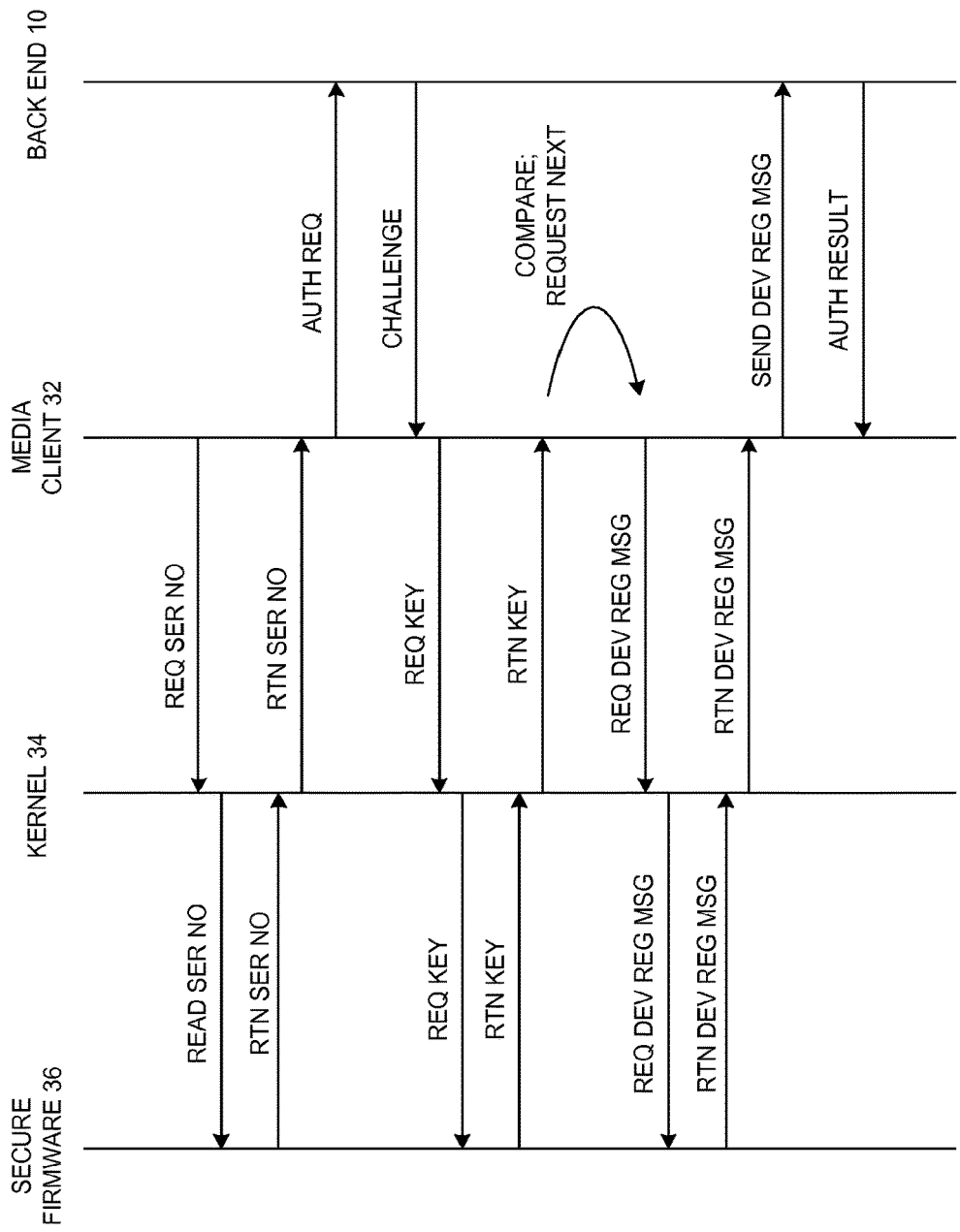
FIG. 6 is a message flow diagram for a device registration process.

FIG. 6 illustrates a subsequent device registration process as follows:
1. The media client 32 requests and obtains the device serial number (S) using a special kernel call. In one embodiment the serial number S is formed as the concatenation of a manufacturer_id(4 bytes)+device_model(4 bytes)+batch_no (8 bytes)+serial_no (8 bytes)

2. The media client 32 sends up to the backend 10 an authentication request containing: S+App_Id (4 bytes)+Android_Time_Stamp (14 bytes)+random_nonce_1 (16 bytes)
3. The backend 10 encrypts the received information using the 2048-bit private key corresponding to the External Root Public Key (KEY2)
4. The encrypted message is sent by the backend 10 down to the device 12
5. The media client 32 requests KEY2 from the kernel 34
6. The media client 32 uses KEY2 to decrypt the message from the backend 10 and then verifies the time stamp, nonce, etc.
7. The media client 32 requests a device registration message from the kernel 34
8. The kernel 34 calls on the secure firmware 36 to create the device registration message which in one embodiment includes (device id token+'#'+Android_Time_Stamp+'#'+random_nonce_1) encrypted with KEY2, where the device id token is a secure hash of S+ChipID (4 bytes)+IN (24 bytes), IN being an individualization number which is chipset_manufacturer_id (4 bytes)+batch_no (8 bytes)+serial_no (12 bytes))
9. The device registration message is sent to the backend 10
10. The backend 10 decrypts the message with the private key corresponding to KEY2, verifies the timestamp and nonce, and uses the device id token as device identification for device registration.
11. The backend 10 returns the result of the device registration back to the media client 32

Robust Obfuscation for App Authentication

Figure 7:
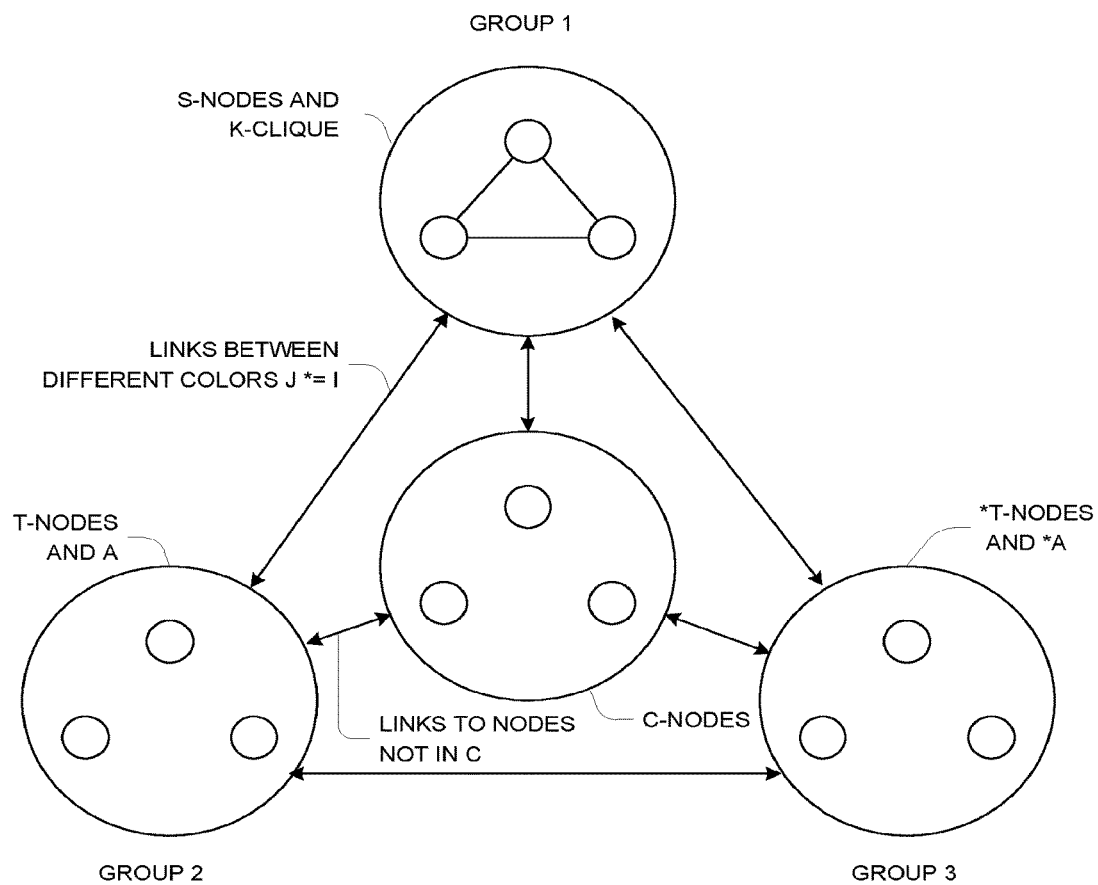
FIG. 7 is a graph representing relationships in a code obfuscation technique.
Figure 8:
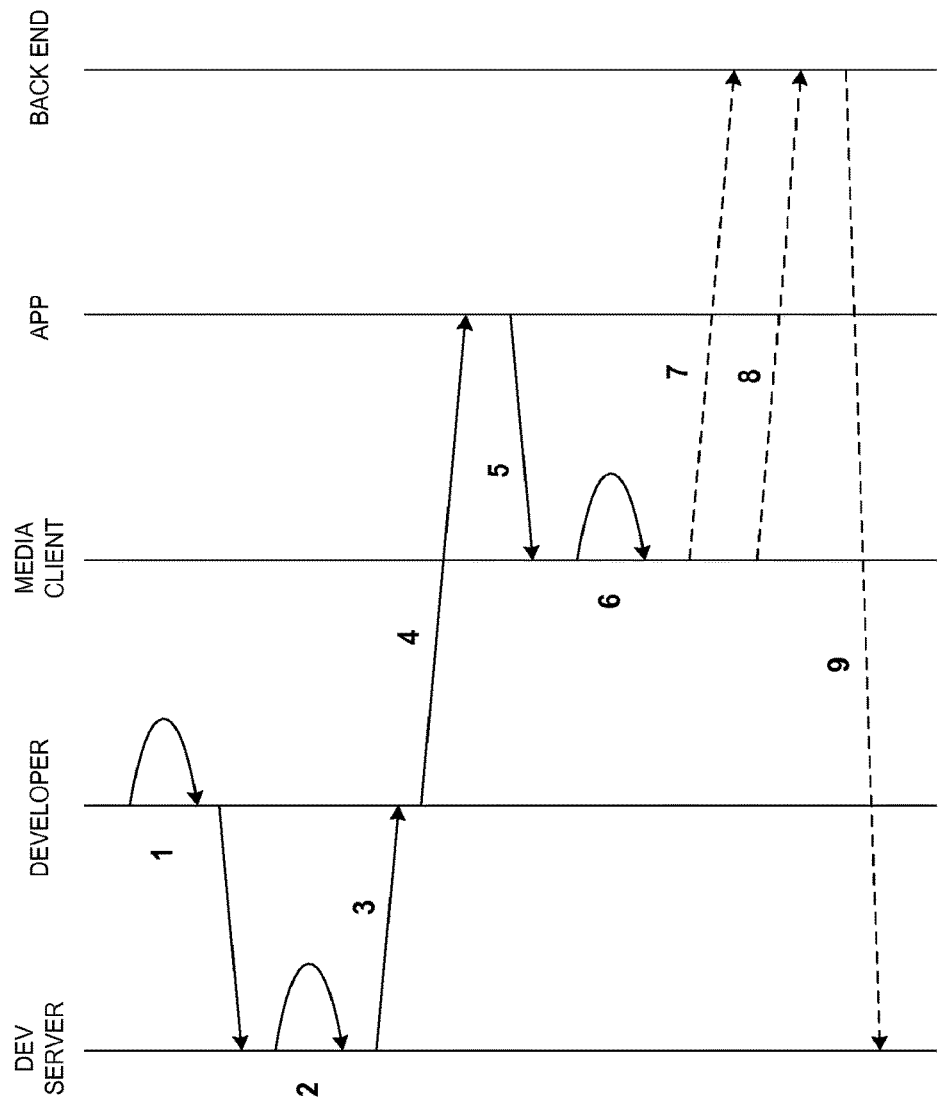
FIG. 8 is a message flow diagram for a code obfuscation technique.

FIGS. 7 and 8 are used to describe a technique of authentication of a sensitive application, such as the media client 32, based on obfuscation of the code in a manner that is difficult to replicate.

App authentication is achieved by a combination of a white-box decryptor to decrypt a private key that is used to establish a 2-way authenticated secure channel. A provably-hard obfuscator is used against reverse engineering and by extension tamper-resistance. The obfuscator uses control-flow flattening in combination with a known hard problem such as 3SAT which is NP-complete which can be reduced to the reachability problem in the flattened control flow. In other words, knowing the control flow is equivalent to solving the known hard problem.

Obfuscation Procedure (Done at Code Development Time)

Portions of the media client code 32 involved in license key retrieval and media playback are obfuscated using this procedure, which includes the following steps carried out by the code developer in his development environment.

Step 1: Select a family of opaque predicates. These are used to create conditional code as shown in step 5 below. Such conditionals are used in the code flattening procedure described later that takes linear code and creates a large branching structure. The available families are:

Root of Prime Residue (RPR):
This is defined as follows
For any prime $P=4X+3$, and any $A<P$, the predicate generating template is "$\{(A^{(X+1)})^2-A\}\% P$" where % denotes the mod operation. This generates a family of predicates by varying A and X that all evaluate to 0 or FALSE.

Similarly, when $P=8X+5$ the corresponding template is "$\{((4*A)^{(X+1)}/2)^2-A\}\% P$".

In general, these predicates have the form of "L-R" where L is $((4*A)^{(X+1)}/2)^2$ and R is A. We randomly pick two instances of this family with the same prime residue and use two left parts as in L-L' where L' is from a family with a different A' and P' where $A \% P = A' \% P'$. It is clear that L-L' evaluates to 0.

The predicates may also be mixed in an expression where $A \% P$ is not equal to $A' \% P'$ in order to obtain a non-zero expression. Another way to get a non-zero expression is to use identities that are always not true as shown next.

Simple Quadratic Polynomial (SQP):
This is defined as follows
"$7*Y^2-1-X^2$" is never 0 for any integers X and Y.
Here, this predicate is used as L-R that is a non-zero expression. This type of predicate is used for introducing conditionals.

Step 2: Next, a collection of obfuscating variables are created that are then used to construct an instance of a graph structure which is then embedded into the code obfuscation as described in step 3 below. A schematic example of such a graph structure is shown in FIG. 7. There may be some selected number of variables, such as 1024 for example. These are arbitrarily divided into two groups G_1 and G_2 using a coin toss selection with the crypto properties of CTR_DRBG. The selection is based on the parity of the generated number; taking only the odd ones into G_1. The membership in G_1 or G_2 is never revealed and known only to the programmer. Note that there is no statement in the code that declares membership in either set; only, the programmer uses the membership to construct the instance of the 3SAT problem, $3SAT_m$, consisting of k clauses, as described below.

$$3SAT_m = (a \lor s_1 \lor t_1) \land (\neg t_1 \lor s_2 \lor t_2) \land (\neg t_2 \lor s_3 \lor t_3) \ldots (\neg t_{k-1} \lor s_k \lor \neg a)$$

where $k>3$ as needed for the proof below.
where k is the size of set G_1 and each of $s_i$ is drawn from the set G_1 and set to TRUE. The rest a and $t_1$ through $t_{k-1}$ are set to random Boolean values calculated at runtime. This setting would always satisfy $3SAT_m$.

The actual settings of the variables are hidden using opaque predicates as shown below.

For example, instead of setting $s_i$=TRUE, we use RPR to do the following—

Set $s_i = 1 - (\{((4*A_i)^{(X+1)}/2)^2 - A_i\} \% P_i)$ where $A_i < P_i$ for some $A_i$ & $P_i$.

The remaining literals tj are set to random values using the same generating template but selecting Aj to be less than or greater than Pj using a coin toss procedure as above.

The computation of the literals is distributed throughout the code by the software developer. The distribution of the settings is done in order to achieve the property of non-locality which is considered as important for code obfuscation.

Next, a graph G is computed using the literals of $3SAT_m$. The vertices can be colored with k+1 colors such that no edge has the same color on its ends if and only if $3SAT_m$ is satisfiable. Then, since the setting of the $s_i$ to TRUE satisfies $3SAT_m$, we also know that the graph is (k+1)-colorable. This knowledge is only known to the developer and hence can be used to check the colors of ends of random edges in the graph to determine the state of the coloring which is then used to guard the code segments.

The graph G is constructed as follows:

Each literal $t_j$, $\neg t_j$, $s_j$, a and $\neg$a are nodes in the graph G

Each clause $C_i$ is a node that is colored i and connected to literals that are not in $C_i$ Each node $s_i$ is colored i and connected to all other s nodes and all literals $t_j$ and $\neg t_j$ where $j \neg = i$ Each of the nodes $t_i$ and $\neg t_i$ are connected by an edge. Each of the nodes $t_i$ are colored i and the nodes $\neg t_i$ are colored k+1. Likewise, the nodes a and $\neg$a are connected by an edge and colored 1 and k+1 respectively. We shall refer to the $t_i$ and $s_i$ as "TRUE" nodes. Note that during the execution of the program the values of the $t_i$ and $\neg t_i$ are randomly varied, the corresponding coloring is altered from i to (k+1) depending on whether the value is TRUE or FALSE respectively. [Note: We will refer to the k+1 color as the FALSE color.]

Lemma: Graph G is (k+1)-colorable.

Proof:

Since each clause $C_i$ has at most 3 literals and there are at least 4 clauses, each clause must be connected to both $t_j$ and $\neg t_j$ for at least one j. Thus, no clause can be colored with the k+1 color.

Thus, graph G is (k+1)-colorable iff there is a TRUE node in each $C_i$ whose color is i. Since we know that the $s_i$ are always TRUE, graph G is (k+1)-colorable. [Note that each clause must be colored with one of the colors from 1 to k, i.e., the color of one of the TRUE nodes.]

Step 3: Next, various portions of the unobfuscated code are marked off for processing. This is done manually during code creation. These portions are tagged using special comment indicators that are later read for code flattening as described next. Note that the process of code flattening is to introduce branching code together with a question to the embedded instance of such that the process of recovering the correct control flow is equivalent to solving a general instance of graph coloring—an NP-complete problem. The instance is constructed using the literals described in step 2 above. In addition, as shown above the instance is colorable with k+1 colors even with the random color assignment and re-linkage of the t nodes. In other words, nodes can migrate between Groups 2 and 3 in the graph G because of symmetry as shown in the figure. This property is exploited in the obfuscation by using some coloring-safe manipulations defined below Coloring-Safe Manipulations
1. At random times, swapping nodes between Groups 2 and 3 and Groups 1 and C and adjusting pointers accordingly;
2. Moving pointers across the Groups 1, 2, 3, and C and within 1 in a manner isomorphic to the coloring Note: The manipulations should only address the specific nodes in the graph and the logic for node selection is done at code creation. In other words, the group membership is never explicit in the code.

In the implementation, the nodes are allocated off an array with a random mapping between the nodes and the groups of the graph G. Only the code obfuscation generator program knows about the 3-SAT instance. The obfuscated program only has the (k+1)-color instance graph G. In other words, the availability of a solution to G is only known to the developer and never revealed to a monitor.

Step 4: Code flattening is achieved by transforming a linear sequence of statements to a branched form. Thus, starting with the sequence X1; X2; X3; . . . ; Xn Note: Dead code may be introduced to increase the length of the segment using opaque predicates such as from SQP as follows:

"If (L−R)==0 then set any of the literals to a random values as described earlier using the generating template".

one gets the following structure

```
Conditional assignment S = {Li, Lj, . . . } ((color(t_a) == color(not t_a)) (color(t_m) ==
color(s_n)) . . . ))
    /** This means if (color(t_a) == color(not t_a)) then S = Li;
    if (color(t_m) == color(t_n)) then S = Lj; and so on
    Only one of these will lead to the correct value of S **/
L: Switch (S)
{
Case 1: Guarded by opaque predicates(
    X1;
    Compute new S via conditional assignment;
    GoTo L;
Case 2: Guarded by opaque predicates(
    X2;
    Compute new S via conditional assignment;
    GoTo L;
Etc.
}
```

Example: Take the following code to be obfuscated:
Func_123 (a, b, c);
This is extended with dead code as follows

```
X1:    If (L1-R1) then
       {
              Func_123 (a, c, b) /** something resembling but slightly different from the
       correct one under Xn **/
              Set s_k to 1-L2-R2
       }
```

-continued

```
X2:     if (L2-R2) then
        {
                Func_123 (a, b, b)
                Set s_m to L5-R5
        }
        ...so on...
Xn      if (Ln==Rn) then/** where n is a multiple of say 3, i.e., n = 3k **/
        {
                Func_123(a,b,c); /** The original code **/
                Set s_x to Lm-Rm
        }
        This gets flattened into the following structure.
        /** Divide the n execution steps into m <= n sequences. **/
/** Randomly select a set C of N labels and choose a permutation, P=P1..Pm of these labels
**/
/** Now, pick a random permutation R (embedding P) as the order of "execution" in the
flattened structure **/
/** Note that each time through the structure only one of the m sequences are executed **/
Set starting label S = Conditional Assignment {004, 120, ... } (color t1 == color t5, color C50
!= color t50, . . . )
/** This sets the S to the 120, but a static analysis cannot determine that **/
L: switch (S) 1
        case 0 :
        {
                /** segment followed by conditional assignment to next S value **/
        }
        *etc.*
        case 1 :
        {
                /** This is the action if the S value was false; in this case, it is a decoy **/
                X5' /** Do something resembling the sequence X5 **/
                pick some nodes t_i and randomly vary them and adjust the pointers
                Conditional Assignment of S
                Go to L
        }
                *** etc. ***
        case P1: /** Correct case for clause_num(P1) **/
        {
                X1 /** If this is the correct sequence for this color **/
                Conditional assignment of S
                Go to L
                }
                }
        }
        ***so on to cover up to N cases **
}
```

As shown in the example, a particular permutation of the N labels is selected. Starting with the first label in the permutation, a value is computed to correspond to a correct setting of the switch variable is used to switch to its case body which computes code that generates the value of correct setting of the next element in the permutation and so on. The setting of this variable is guarded by conditional code that tests for the color setting of nodes of the graph mapped by the 3SATm instance. Only knowledge of the setting of the solution to the coloring problem would let correct selection of the cases without resorting to a brute-force search.

Thus, the value of the next address (label of case) that will be executed is only known by the computation inside the case statement. Further, each of these cases compute the value of the next label inside another guarded statement as described next. There are N cases where on each go around we set the next case label and only for the right combination will guarantee the correct setting for each of the k colors. For wrong settings of the labels, the case statement will compute a wrong value of S for the next iteration. Also, there is only one correct traversal through the values of the labels and we will prove later the correct traversal is proof of knowledge of the solution of the coloring problem and in turn the 3SAT problem. In other words, the only other way is random guessing which is NP-hard.

Step 5: Guarding with opaque predicates (X) is achieved by using the following structure.

```
If (A-B = 0) then
   {
      Code to be obfuscated
   }
else
   {
      Decoy code that looks like the correct code with small variations that
makes it incorrect.
   }
An alternate form is,
If (A-B+C = 0) then /** where C is one of the literals from G1 **/
   {
      Code to be obfuscated
   }
else
   {
      Decoy code that looks like the correct code with small variations that
makes it incorrect.
   }
```

Authentication Protocol

The authentication protocol is outlined in FIG. 8 and described as follows:
1. The developer creates the code including:
    a. the 2048-bit public key (PUB) (2048 bits long and generated on the development server using/dev/random) that is encrypted with a 128-bit AES key (WB-AES-Key-2) as well as
    b. a white-box decryptor (whose key is WB-AES-Key-2)

[Note: The reason for encrypting the public key is to ensure its authenticity as explained below.]

2. [The following may have specifics to the Android® platform] A 2048 bits long private signing key (APP_PRK), specific to the APP, is generated using /dev/random on a secure server matching the security criteria of the development server. The corresponding public key (APP_PUB) is used to generate an X.509 certificate (APP_CERT) that is signed with APP_PRK (i.e., self-signed). This certificate is securely conveyed to the developer via email using PGP to secure the transmission. APP_CERT is encrypted with WB-AES-Key-2 and stored in the AMC.
3. The app is obfuscated as described above and prepared for distribution via the app store as indicated in the next step.
4. [Also Android] The content provider (or app developer on behalf of the content provider) submits the signed app using his or her Google Play Android Developer Console account. The signed certificate authenticates the id of the submitter. The content provider/app developer must store the APP_CERT in a "Key Store" using the "Keytool" utility. Finally, the app is packaged with APP_CERT for distribution via Google Play app store using the "jarsigner" utility that takes as input the Key Store and the key alias and inserts the APP_CERT into the app package.
5. [Also Android] The user downloads, installs and launches the app on his device. At time of installation, the Android OS checks the validity of the certificate attached to the App. This is done as part of the installation process. In addition, we perform a verification of the authenticity of the certificate as described next.
6. For each launch of the app, the certificate attached to the app must be verified. The instance of the app (aka "client") starts and uses the white-box decryptor to decrypt the encrypted APP_CERT stored in the AMC. From this decrypted string, the client uses APP_PUB* (which we trust) to authenticate the signature of the app as follows.

The certificate attached to the app is validated by obtaining the signature via the packageInfo api as shown below. First, the public key in the certificate is compared with APP_PUB* and if this matches we proceed to verify the signature. The signature attached to the certificate is decrypted using APP_PUB* to obtain the cryptographic hash of the checksum of the certificate which can then be verified directly. If this signature is authenticated, the client proceeds to setup a mutually-authenticated SSL-session with the backend. Note that this step is done with each launch of the app.

[Also Android] The packageInfo.signatures api may be used to get the public key from the app signature. It is used to only authenticate the id of the developer and can be compared against the trusted value of APP_PUB*.

```
public void onCreate(Bundle savedInstanceState) {
    super.onCreate(savedInstanceState);
    PackageManager pm = this.getPackageManager( );
    String packageName = this.getPackageName( );
    int field = PackageManager.GET_SIGNATURES;
    PackageInfo packageInfo = pm.getPackageInfo(packageName, field);
    Signature[ ] signatures = packageInfo.signatures;
    // and here we have the DER encoded X.509 certificate
    byte[ ] certificate = signatures[0].toByteArray( );
}
```

7. The client uses an X.509 certificate (CLIENT_CERT) signed by developer with a 2048 bit key that is generated on development server using/dev/random for entropy. CLIENT_CERT is embedded in the app. The establishment of a 2-way authenticated secure channel is achieved using an AES-128 white-box decryptor to decrypt a private SSL key (SSL) and use it to establish the secure channel. SSL is 2048 bits long and generated on the development server using /dev/random for entropy. SSL is stored encrypted (the encryption is necessary to protect the confidentiality of the private key SSL) with the whitebox key WB-AES-Key2 (same as the one described earlier in the document under the section called "Device Registration") and would be deemed secure given the strength of the AES encryption and the robust obfuscation. The server uses its own certificate to authenticate with the client.
8. The backend authenticates the client by virtue of the mutual authentication via SSL.
9. Next, the client does a device registration as described above. No push notification or push nonce may be needed.
10. The backend then sends down the content key encrypted with WB-AES-Key-2.
11. The key is decrypted only in static memory and never stored on disk unencrypted. Furthermore, the key is decrypted only for content decryption and the memory is securely erased by overwriting with a robust and secure bit-pattern as described in below.
12. The WB AES-Key-2 and APP_PUB are renewed by forced app upgrades.

Other Measures

Buffers containing decrypted session-keys are overwritten with a robust and secure bit-pattern after use. We must not use heap memory and only use local buffers (i.e., in stack variables) and to securely erase them when control passes out of the routine. Various bit-patterns (0xF6, 0x00, 0xFF, random, 0x00, 0xFF, random) are written in sequence into the buffer. Unencrypted keys are never written out to disk.

Equivalence of Execution Discovery to Graph-Coloring:

The technique is characterized in part by the following two assertions:
1. A correct sequence of executing the statements X1 . . . Xn implies the knowledge of the correct answers to the conditionals (used in the guards) which are based on the coloring of G.
2. A correct set of answers to the conditionals about the coloring of G encountered via an execution through the flattened structure results in the correct execution sequence X1 . . . Xn.

The first assertion follows from the construction of the obfuscation. In other words, the correct execution sequence X1 . . . Xm shows apriori knowledge of the solution to the instance G of the graph-coloring problem. This is because the structure and coloring of the graph is not known ahead of time by inspection. It varies at different parts of the code including inside the sequence X1 . . . Xn. Without apriori knowledge of the solution, one would have to know how to solve the general coloring problem, which is computationally difficult.

For the second assertion, it is enough to show that any execution sequence tied to a correct setting of the conditionals must yield the correct order of execution. This would establish the equivalence of the execution discovery to the graph-coloring problem where the solution of the latter is known to be NP-complete.

Base: E=1. The proposition is trivially true because there is only one order for this sequence.

Induction Hypothesis (I.H.): Assume that the proposition is true for some E=m where m>1, i.e., any execution sequence that correctly answers the conditionals about the graph coloring of G is also a correct execution of X1 . . . Xn.

It is then shown that the proposition holds for E=m+1. Consider an instance of the problem whose execution sequence Y is of length m+1.

The structure of any element of the sequence Y is as follows $$A1 A2 A3 A4 A5 \quad (1)$$

where
1. A1 and A3 are one or more instances of decoy code guarded by false opaque predicates;
2. A2 is the actual code that needs to be executed;
3. A4 is the conditional assignment of the next value S of the switch statement; and
4. A5 is the GoTo Let the last two elements of Y be y' and y". Now, we find a way to combine these elements in order to produce an execution of length m that is isomorphic to the execution graph of the previous execution sequence Y, i.e., is a correct execution sequence of X1 . . . Xn. We define such a combination as follows:

$$A1'A1''A2'A2''A3'A3''\text{Combined}(A4',A4'')A5'' \quad (2)$$

where the A components belong to y' and y" respectively are indicated by the prime notation.

Combined(U,V) is the conditional assignment resulting from the aggregation of the conditions of the individual conditions in U and V and the corresponding assignment statements. Clearly, the combination in (2) above has the same structure of (1). Consequently, it can replace element y' and y" resulting in an execution sequence of length m.

From I.H., we know that any such execution sequence (of length m) whose conditionals correctly satisfy the coloring of G, is a correct execution of X1 . . . Xn. We also know that the conditionals of such a sequence maps to the corresponding execution of Y where the conditionals are split over steps y' and y". We only need to show that this execution sequence is also correct.

In particular, we know that the combined sequence was correct. So, we now need to show how the decomposition into the original sequences of Y would retain the correctness of the execution. Excluding the case where y" is null, we observe that if there are conditionals in y" that satisfy questions about the coloring, then these must include a correct step of the execution by construction. Note that the other components of y' and y" are coloring-safe, i.e., they do not alter the outcomes of the color-related questions in the conditionals.

FIG. 8 diagrams the above-described technique, including the following operations:
1. Create 2048-bit key pair (APP_PUB, APP_PRK); Generate APP_CERT;
2. X=Encrypt(PUB) with WB-AES-Key-2; Y=Whitebox Decryptor for WB-AES-Key-2; Embed X & Y in app; Obfuscate app using 3-SAT instance;
3. Send obfuscated app
4. Sign app with APP_CERT and submit to App Store
5. Download; install; launch app
6. On launch AMC uses Y to decrypt X to get APP_PUB*; Use APP_PUB* to validate app signature; Use Y to decrypt SSL
7. Create mutually authenticated SSL session with backend. Send device registration request with unique id.
8. On play request, ask backend for content key
9. Send down content key encrypted with WB-AES-Key-2

In FIG. 8, the dotted lines for items 7-9 indicate an SSL session with 2048 bit key.

In brief summary, the following are important aspects of the presently disclosed methods and apparatus:

The application, which implements the client-side of the DRM system, is user-installable/renewable on the client device The client device employs secure boot and verifies the user-installed application The application is hardened against reverse engineering The application utilizes a special API provided by the client device to tie into the secure boot, bridging the gap between the secure boot and the client-side of the DRM system contained within the application.

While various embodiments of the invention have been particularly shown and described, it will be understood by those skilled in the art that various changes in form and details may be made therein without departing from the spirit and scope of the invention as defined by the appended claims.

What is claimed is:

1. A client device, comprising:
at least one processor;
one-time-programmable (OTP) storage including a first verification key and one or more second verification keys; and
a computer-readable storage medium, coupled to the at least one processor, including:
a media client,
firmware,
a boot image including
a public encryption key securely stored in the boot image, and
an encrypted symmetric key, and
computer-readable instructions, when executed by the at least one processor, are configured to:
engage in a secure boot process to authenticate the boot image for use in a rights management scheme employing a private encryption key at a rights management server and the public encryption key by:
verifying a signature of the public encryption key using the first verification key,
decrypting the encrypted symmetric key to generate a decrypted symmetric key,
verifying a signature of the decrypted symmetric key using the one or more second verification keys, and
verifying a signature of the boot image using the decrypted symmetric key,
load and execute the firmware, responsive to successful completion of the secure boot process, responsive to a request from the media client, use, by the firmware, the public encryption key to create an encrypted device registration message, and return the encrypted device registration message to the media client, and forward, by the media client, the encrypted device registration message to the rights management server to register the client device.

2. The client device according to claim 1, wherein the boot image further includes respective stored signatures for the stored public encryption key, the encrypted symmetric key, and firmware components of the boot image, and wherein the computer-readable instructions are further configured to verify a signature for a given key or firmware component by (1) calculating a signature for the given key or firmware component and (2) comparing the calculated signature with a respective one of the stored signatures.

3. The client device according to claim 1, wherein the media client implements a client side of a digital rights management (DRM) system.

4. The client device according to claim 1, wherein the media client is user-installed on the client device.

5. The client device according to claim 4, wherein the firmware of the client device verifies the media client on the client device.

6. A method enabling a client device to authenticate itself to a media client and a rights management server, the method comprising:

engaging in a secure boot process to authenticate a boot image for use in a rights management scheme employing a private encryption key at a rights management server and a public encryption key securely stored in the boot image by:

verifying a signature of the public encryption key using a first verification key stored in one-time-programmable (OTP) storage, decrypting an encrypted symmetric key stored in the boot image to generate a decrypted symmetric key, verifying a signature of the decrypted symmetric key using one or more second verification keys stored in OTP storage, and verifying a signature of the boot image using the decrypted symmetric key, loading and executing firmware stored on the client device, responsive to successful completion of the secure boot process, responsive to a request from a media client stored on the client device, using the public encryption key to create an encrypted device registration message, and returning the encrypted device registration message to the media client, and forwarding the encrypted device registration message to the rights management server to register the client device.

7. The method according to claim 6, wherein the boot image further includes respective stored signatures for the stored public encryption key, the encrypted symmetric key, and firmware components of the boot image, and a signature for a given key or firmware component is verified by (1) calculating a signature for the given key or firmware component and (2) comparing the calculated signature with a respective one of the stored signatures.

8. The method according to claim 6, wherein the media client implements a client side of a digital rights management (DRM) system.

9. The method according to claim 8, wherein the media client is user-installed on the client device.

10. The method according to claim 9, wherein the firmware of the client device verifies the media client on the client device.

* * * * *